United States Patent [19]

Maldavs

[11] 4,150,691

[45] Apr. 24, 1979

[54] QUICK DISCONNECT COUPLING

[75] Inventor: Ojars Maldavs, Lincoln, Nebr.

[73] Assignee: Gould Inc., Rolling Meadows, Ill.

[21] Appl. No.: 840,302

[22] Filed: Oct. 7, 1977

Related U.S. Application Data

[63] Continuation-in-part of Ser. No. 687,001, May 17, 1976, Pat. No. 4,077,433.

[51] Int. Cl.² .................................................. F16L 37/28
[52] U.S. Cl. .................................................. 137/614.03
[58] Field of Search ..................... 137/614.02, 614.03, 137/614.04, 614.05

[56] References Cited

U.S. PATENT DOCUMENTS

| 3,613,726 | 10/1971 | Torres | 137/614.03 |
| 3,791,411 | 2/1974 | Bogeskov | 137/614.02 |

Primary Examiner—Robert G. Nilson

[57] ABSTRACT

A quick disconnect coupling for coaction with a check-valve equipped male coupling is provided with a lockable spool and a lockable valve actuator. A first locking pin on the spool locks the spool when the male coupling is not coupled with the female coupling and is engageable with the male coupling for unlocking the spool when the male coupling is inserted into the female coupling. The locking mechanism for the actuator permits the actuator to move when a pressurized male coupling is inserted and locks the actuator when the actuator opens the check valve.

9 Claims, 7 Drawing Figures

QUICK DISCONNECT COUPLING

RELATED APPLICATION

This application is a continuation-in-part of my co-pending application entitled "Quick Coupling Device", Ser. No. 687,001, filed May 17, 1976, now U.S. Pat. No. 4,077,433.

BACKGROUND AND SUMMARY

This invention relates to a quick coupling device, and, more particularly, one used in connection with pressure fluid. For example, agricultural tractors have a quick disconnect coupling for connecting and disconnecting hydraulic hoses between the tractor and a hydraulically operated implement. The agricultural tractor provides the power source to operate the implement hydraulic components. Hydraulic hoses connect the tractor power source to the implement hydraulic system. Quick disconnect couplings are used on the hydraulic hoses to enable disconnecting the implement from the tractor. The female half of the coupling is mounted on the tractor, and the male half of the coupling is on the implement hose.

On many occasions, the uncoupled halves of the coupling contain trapped hydraulic pressure. Conventional couplings cannot be connected against this trapped pressure because of the great force required to overcome the trapped pressure force. Therefore, couplings used in pressurized systems are desirably of a design which permits the manual connection against pressure in either or both halves of the coupling.

There are several types of couplings on the market which deal with this problem, but each has certain disadvantages which limit its use. Some of the current types in use are lever-type couplings as shown, for example, in U.S. Pat. No. 3,130,749, spring-center-valving couplings as shown, for example, in U.S. Pat. No. 3,530,887, and spool-type couplings as shown in my co-pending application, Ser. No. 687,001, filed May 17, 1976, now U.S. Pat. No. 4,077,433.

The disadvantages of a conventional lever-type coupling is that the lever must be operated after each connection, oil is spilled during each disconnection, and high pressure drop occurs across the coupling.

In conventional spring-center-valving coupling the valves can flow shut or check-off under high flow rates, and the coupling will not connect under all pressure conditions.

With a spool-type coupling, if the male coupling is misaligned during connecting, it is possible for the spool to be shifted to the "coupled" position before the male coupling is completely inserted.

The inventive coupling is a spool-type coupling which enjoys the advantages of this type of coupling but which eliminates the disadvantages. The advantages of a spool-type coupling are simple push-to-connect and pull-to-disconnect operation which does not require levers, valves which close before disconnection to minimize oil spillage during disconnection, and a short flow passage which minimizes pressure drop. The additional advantages provided by this invention are a locking mechanism for the spool which prevents the spool from shifting until the male coupling is completely inserted and a locking mechanism for the actuator which positively locks the actuator to open the check valve of the male coupling when the male coupling is not pressurized and which permits the actuator to move to allow the male coupling to be inserted when the male coupling is pressurized. When the check valve of a pressurized male coupling is open, the actuator moves to a locked position to maintain the check valve in the open position.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
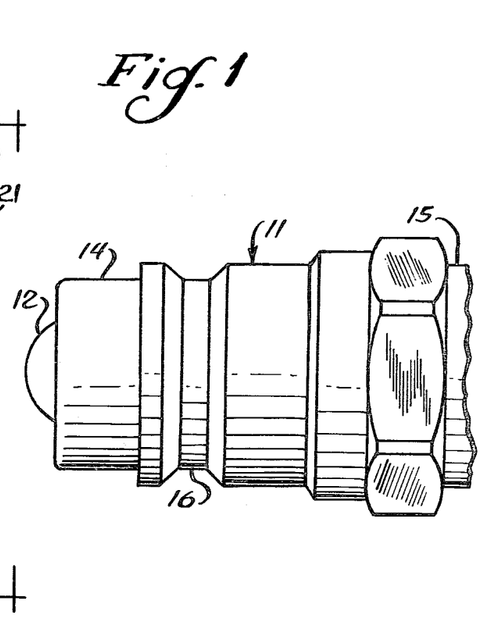
FIG. 1 is an elevational view, partially in section, of the inventive coupling device and also showing to the right thereof a conventional male coupling half.

In the illustration given, and with reference first to FIG. 1, the numeral 10 designates generally the inventive female quick disconnect coupling, and the numeral 11 designates generally a conventional male quick disconnect coupling. The male coupling 11 includes the conventional ball check valve 12 resiliently urged against a seat 13 (see FIG. 6) provided in a generally cylindrical casing 14. The ball is urged against the seat by a spring (not shown), and rearward travel of the ball beyond its fully opened position is prevented by a stop. The male coupling is attached to a hydraulic hose 15. Referring again to FIG. 1, the casing 14 is equipped with a conventional groove 16 which receives the lock balls 17 provided with the female coupling 10. Alternatively, the male coupling 11 may be equipped with a poppet check valve rather than the ball check valve shown.

The female coupling 10 includes an outer housing 18 which is equipped with an axially extending circular bore 19. The outer housing 18 is usually mounted on the tractor and can be of various configurations or shapes. A generally cylindrical tubular housing or body 20 is retained within the outer housing by a threaded retainer ring 21. The retainer ring includes a radially outwardly extending externally threaded annual flange 22 which is engaged with internal threads 23 on the outer housing. A pair of slots 24 are provided on the outer or forward end of the retainer ring to permit the retainer ring to be inserted and removed from the housing. The retainer ring forces a shoulder 25 on the outer surface of the inner body 20 against a mating shoulder on the bore of the outer housing.

The tubular body 20 is provided with a central bore 26 having an open forward end 27 which opens into the bore of the retainer ring and a rear end 28. A plurality of ports 29 extend through the body adjacent the rear end and communicate with an annular groove 30 and a fluid passage 31 in the outer housing. The fluid passage 31 is connected to the hydraulic fluid pump on the tractor.

Figure 2:
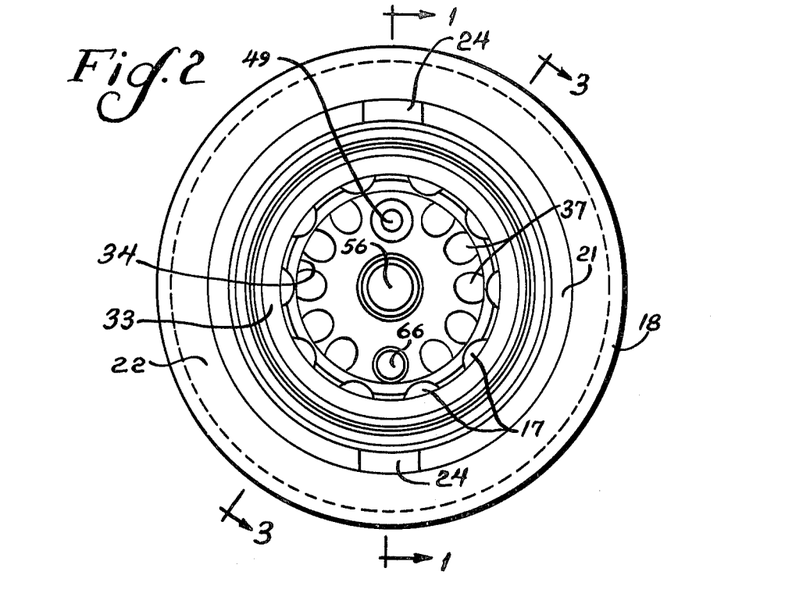
FIG. 2 is an end view of the inventive coupling taken along the line 2—2 of FIG. 1.
Figure 3:
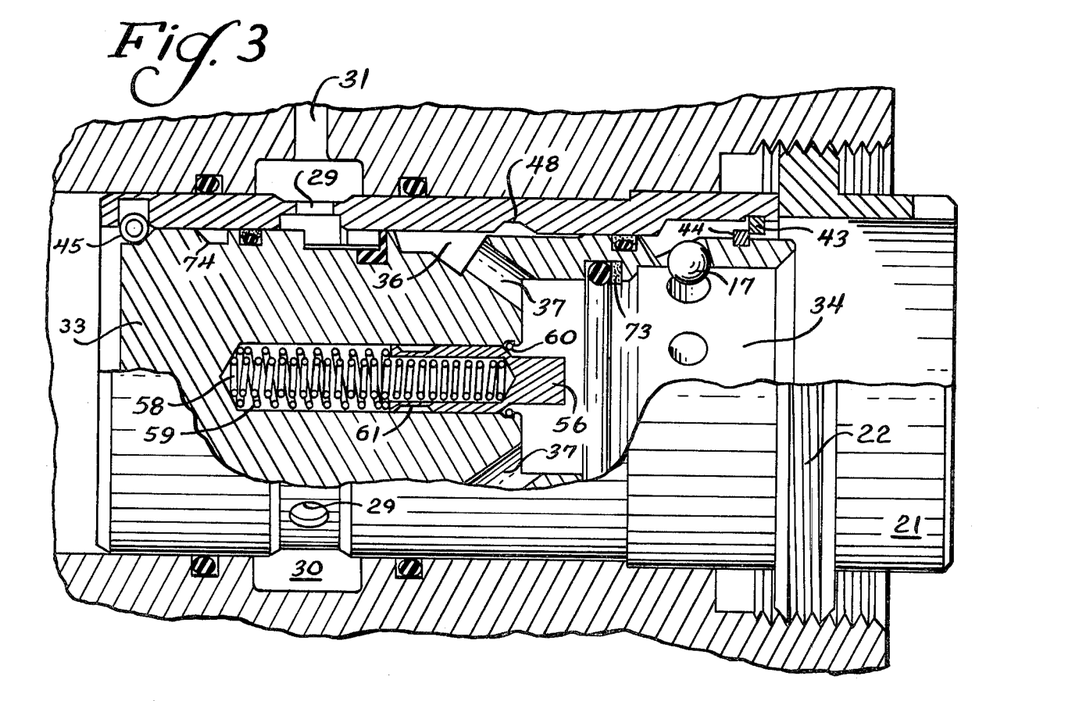
FIG. 3 is an elevational view, partially in section, taken along the line 3—3 of FIG. 2.

A spool 33 is slidably fitted within the bore 26 of the body and has a central bore or fluid passage 34 which has an open forward end 35. Referring to FIG. 3, the bore 34 communicates with an annular groove 36 in the outer wall of the spool through a plurality of circumferentially spaced outwardly and rearwardly slanted passages 37 (see also FIG. 2). When the spool is in the position shown in FIG. 1, the groove 36 in the spool and the ports 29 in the body 20 are sealed by sealing rings 38, 39, and 40 which are mounted in annual recesses in the spool and which sealingly engage the body 20. The groove 30 in the outer housing is sealed by a pair of sealing rings 41 and 42. A pair of retaining rings 43 and 44 mounted at the forward ends of the body and the spool, respectively, prevent the spool from moving to the right beyond the FIG. 1 position.

The spool is detented in the FIG. 1 position by a detent garter spring 45 at the rear end of the body which is received in a recess 46 in the outer wall of the spool. The spool is locked in the FIG. 1 position by a pair of locking balls 47 which are confined within a radial hole in the spool and which project into a groove 48 in the body. The balls are maintained in the locking position by a locking pin 49 which is slidably mounted in a bore 50 in the spool. The locking pin is movable rearwardly or to the left as viewed in FIG. 1 but is resiliently biased toward its FIG. 1 position by a spring 51. The locking pin includes a frustoconical camming portion 52 and a forwardly projecting end portion 53. A cross bore 54 equalizes the hydraulic pressure at the front and rear of the locking pin.

An actuator 56 is slidably mounted in another bore 57 in the spool and is resiliently biased forwardly by a pair of concentric coil springs 58 and 59. A retainer ring 60 retains the actuator within the spool. The actuator is provided with a locking recess 61 in its outer wall which is engageable by a locking ball 62 which is confined within a hole in the spool. The locking ball is actuated by cam means designated generally by the numeral 63.

The cam means 63 includes a tubular sleeve 64 which is slidably mounted in a bore 65 in the spool, and a second locking pin or rod 66 which extends through the sleeve and is slidable therewithin. The locking pin 66 includes a headed forward end 67 and a flange 68 which is engageable with the rear end of the sleeve. A coil spring 69 engages the flange and resiliently biases the locking pin and the sleeve to the position shown in FIG. 1, and a coil spring 70 within the sleeve engages the head 67 of the pin and further biases the pin to the right. Suitable crimp means maintains the sleeve within the bore 65. The sleeve includes a cam surface 71 which is engageable with the locking ball 62 for forcing the ball radially inwardly into the locking groove 61 in the actuator when the sleeve moves to the left.

Figure 4:
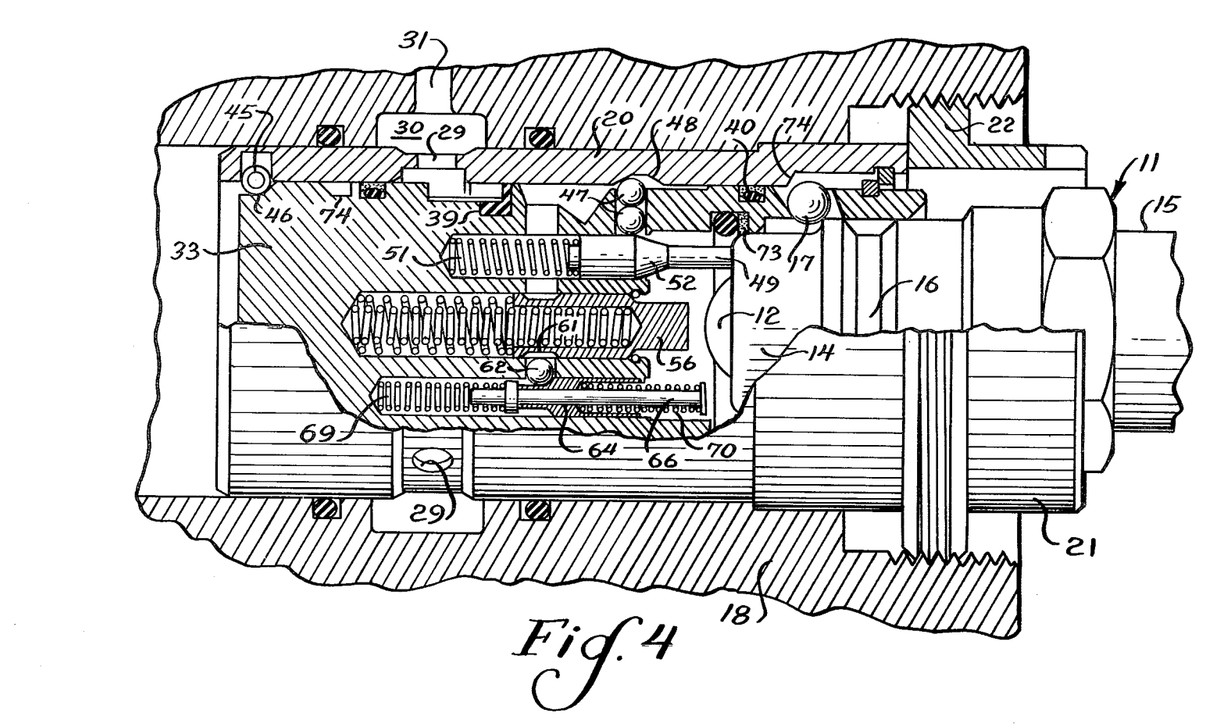
FIG. 4 is a view similar to FIG. 1 but showing the mating male coupling partially inserted into the female coupling.

FIG. 4 illustrates the male coupling 11 partially inserted into the female coupling. The locking balls 47 are retained within the groove 48 by the locking pin 49 and prevent the spool 33 from moving to the left. The forward end of the casing 14 of the male coupling is sealingly engaged by a sealing ring 73 on the spool before the front of the casing engages the locking pin 49.

As the male coupling continues to move to the left into the female coupling, the lock balls 17 will be forced radially outwardly into the bore of the tubular body, and the locking pin 49 will be moved to the left. As the camming portion 52 of the locking pin moves under the locking balls 47, the locking balls are free to be cammed inwardly out of the locking groove 48, and the spool can shift to the left when sufficient force is applied to move the detent garter spring 45 out of the recess 46 at the rear of the spool.

Figure 5:
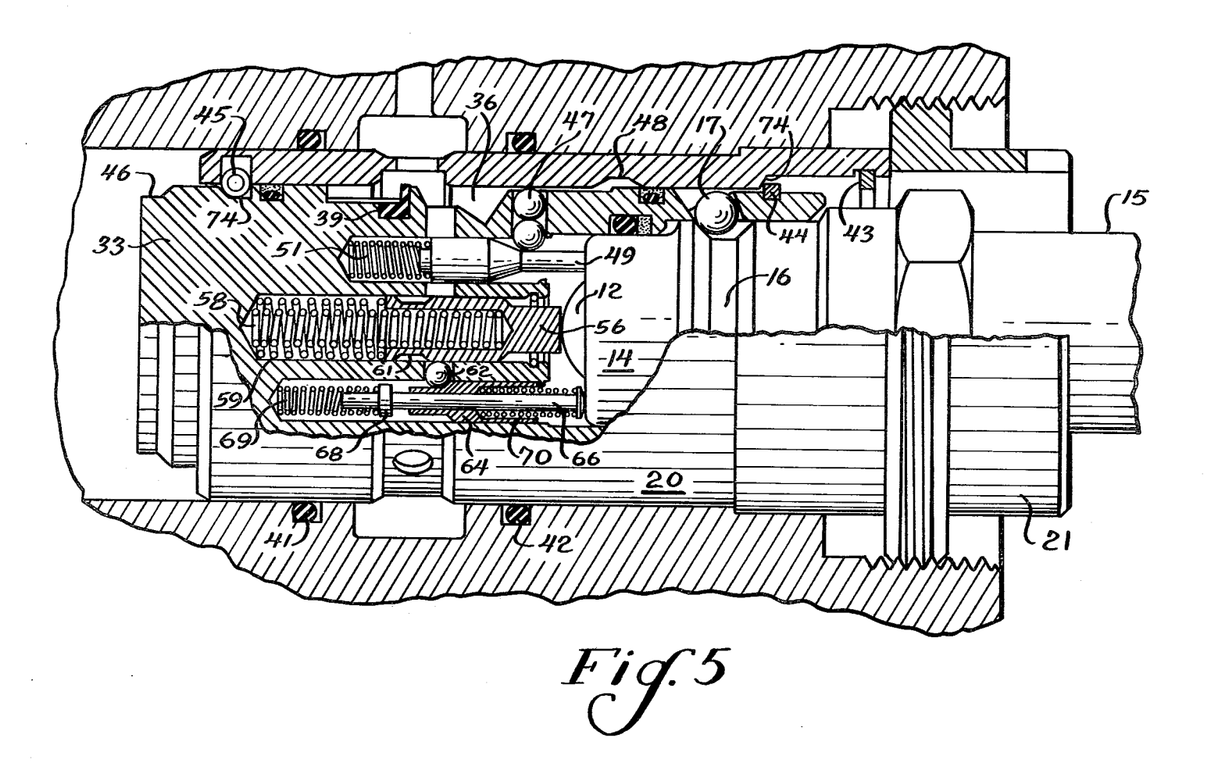
FIG. 5 is a view similar to FIG. 4 but showing the female and male couplings in their coupled position and the check valve of the male coupling closed.

FIG. 5 shows the male coupling after it has been completely inserted into the female coupling. The locking pin 49 has been forced to the left by the male coupling to allow the locking balls 47 to move out of the groove 48, and the spool has been shifted to its rearward position. The detent garter spring 45 is received in recess 74 and detents the spool in the rearward position. As the spool shifts from its FIG. 4 position to its FIG. 5 position, the locking balls 17 are cammed inwardly by a camming shoulder 74 on the tubular body into the groove 16 of the male coupling to lock the male and female couplings together.

The relative spacing between the front end of the actuator 56 and the ball valve 12 of the male coupling and between the second locking pin 66 and the casing 14 of the male coupling is such that the ball valve will contact the actuator before the casing contacts the locking pin 66. If fluid pressure trapped within the male coupling is sufficient to hold the ball valve closed as the ball valve engages the resiliently biased actuator, the actuator will be moved to the left against the forces of the springs 58 and 59. The locking groove 61 in the actuator will thereby move past the locking ball 62, and the sleeve 64 will be prevented from shifting to the left by the locking ball 62 when the locking pin 66 is engaged by the casing of the male coupling. The male coupling shown in FIG. 5 is pressurized, and the actuator has been moved rearwardly by the ball valve 12. The sleeve 64 is prevented from moving rearwardly by the locking ball 62, and the locking pin 66 slides rearwardly within the sleeve against the bias of the springs 69 and 70.

Figure 6:
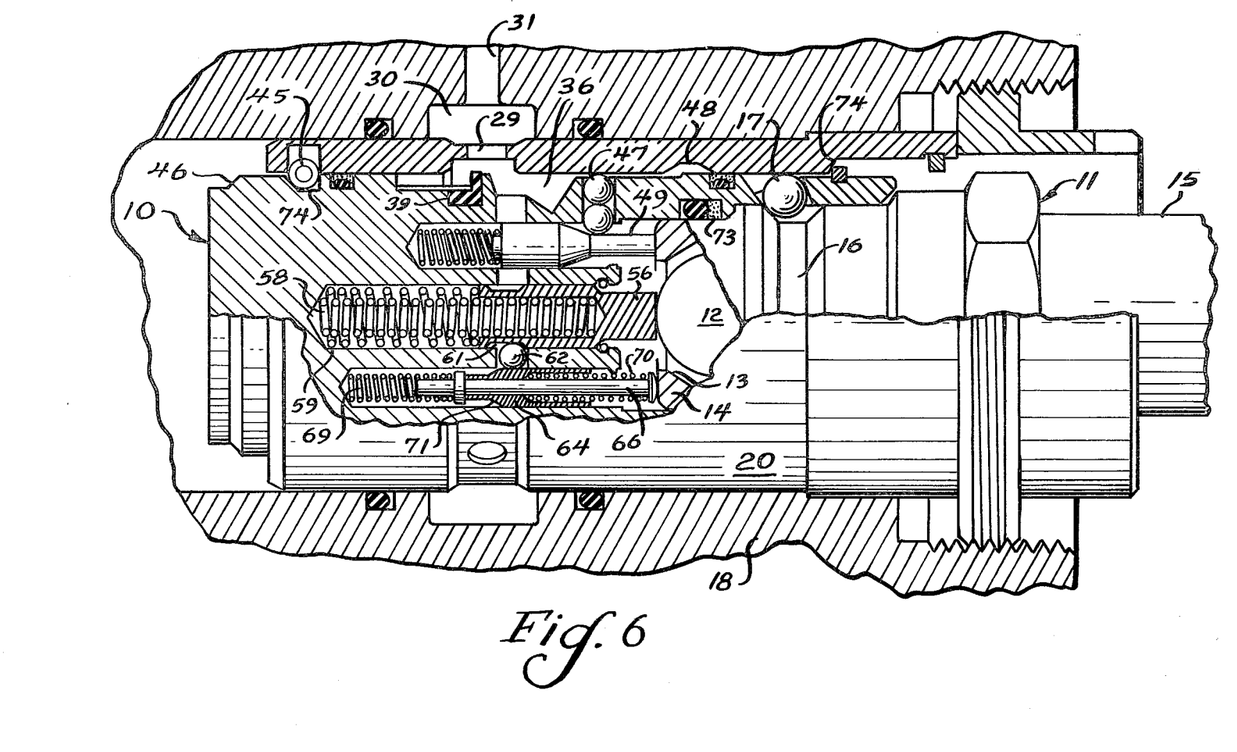
FIG. 6 is a view similar to FIG. 5 but showing the check valve of the male coupling open.
Figure 7:
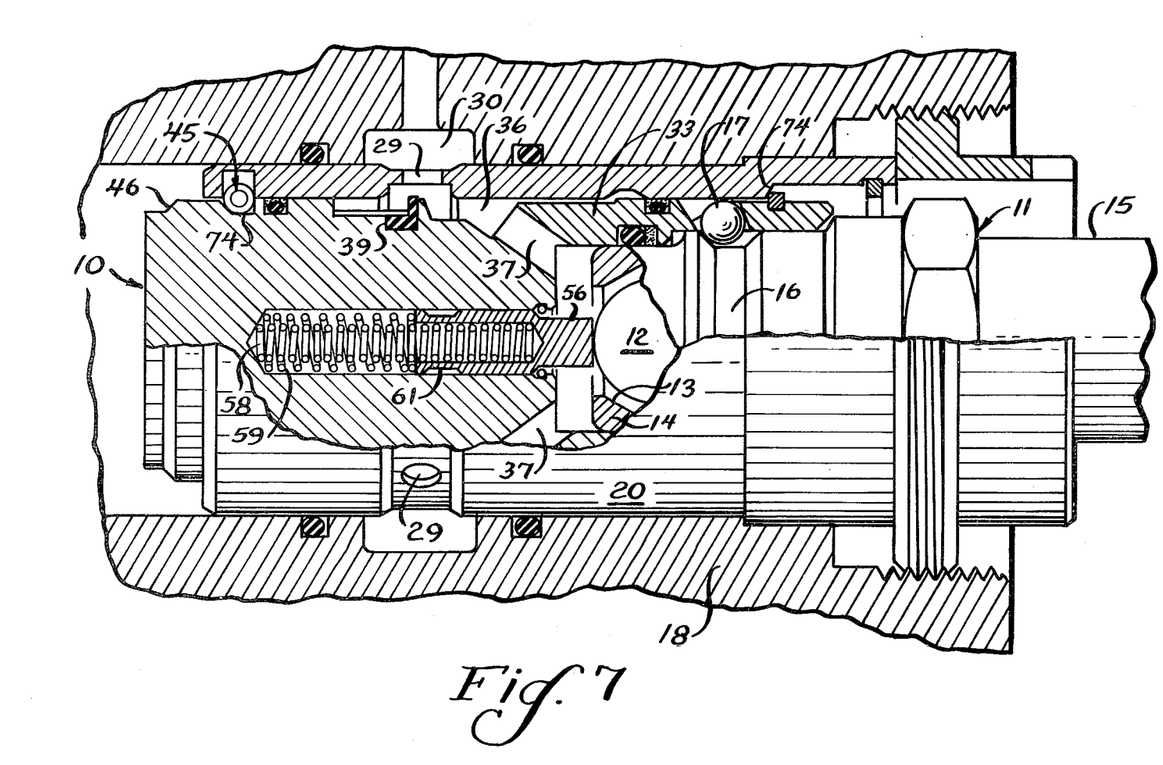
FIG. 7 is a view similar to FIG. 3 but showing the male coupling in the coupled position with the check valve open.

When the spool has shifted to its rearward position, hydraulic fluid can flow from the fluid passage 31 in the outer housing 18 through the ports 29 in the tubular body 20 and through the slanted passages 37 (FIGS. 3 and 7) to the ball valve. If the male coupling is pressurized as in FIG. 5, operating the hydraulic control valve on the tractor will supply pressurized hydraulic fluid to the female coupling, and this pressure, together with the force exerted by the actuator under the influence of the springs 58 and 59, will open the ball valve as shown in FIGS. 6 and 7. As the ball valve retracts into the male coupling and the actuator moves forwardly, the locking ball 62 will be forced into the locking groove 61 of the actuator by the camming portion 71 of the sleeve 64, which is biased rearwardly by the compressed spring 70. As the locking ball 62 moves into the groove 61, the camming portion of the sleeve will pass the locking ball, and the sleeve will retain the locking ball in the locking groove as shown in FIG. 6.

FIGS. 6 and 7 show the female and male couplings completely coupled. The ball valve 12 of the male coupling is locked in an open position by the actuator, and the spool 33 is detented in the rearward position by the detent garter spring 45. Hydraulic fluid flows through the fluid passage 37 (FIG. 7) of the female coupling and past the open ball valve.

Referring again to FIG. 4, if the male coupling is not pressurized when it is inserted into the female coupling, the ball valve 12 will be pushed to the right by the actuator 56, the forces exerted on the actuator by the springs 58 and 59 being greater than the force exerted on the ball valve by the spring in the male coupling. The locking groove 61 of the actuator will therefore remain aligned with the locking ball 62, and as the locking pin 66 is engaged by the casing 14 of the male coupling, the sleeve will be pushed rearwardly by the spring 70. As the sleeve moves rearwardly, the locking ball will be cammed into the locking groove of the actuator.

The male coupling may be disconnected simply by pulling on the hydraulic hose 15 attached to the coupling. When a pulling force is exerted on the male coupling sufficient to move the detent garter spring 45 out of the recess 74 of the spool, the spool will move to the right. When the lock balls 17 move past the camming shoulder 74 of the tubular body, the balls will move out of the groove 16 of the male coupling to release the male coupling. Before the lock balls 17 release the male couplings and before the end of the male coupling moves past the seal ring 73, the ball valve 12 moves out of contact with the actuator 56 and closes. Similarly, the fluid passages through the spool are sealed from the fluid passage in the housing before the couplings are disconnected by the seal ring 39, which moves forwardly past the ports 29 to engage the tubular body.

As the male coupling moves out of contact with the locking pin 49, the camming portion 52 of the locking pin is urged against the lock balls 47 by the spring 51. When the spool reaches its forward position, the locking balls are forced into the locking groove 48 in the tubular body by the camming portion of the locking pin, and the spool is thereby locked in its forward position.

Since the fluid passage between the outer housing and the bore of the spool is opened and closed by a simple shearing action of the sliding spool, the fluid passage can be opened by rearward movement of the spool even when the fluid passage in the outer housing is pressurized. Accordingly, the female and male couplings can be connected when either or both of the couplings contain trapped hydraulic pressure.

While in the foregoing specification a detailed description of a specific embodiment of the invention was set forth for the purpose of illustration, it is to be understood that many of the details hereingiven may be varied considerably by those skilled in the art without departing from the spirit and scope of the invention.

I claim:

1. A quick disconnect female coupling for coaction with a check-valve equipped male coupling, the female coupling comprising:

a generally tubular housing having an axially extending bore open at one end for receipt of said male coupling and a port through the housing communicating with said bore, a spool slidably mounted in said bore and having a central flow passage and an outwardly extending flow passage extending therethrough communicating with the central flow passage, the spool being movable between a first position in which the outwardly extending flow passage of the spool is sealed from said port in the housing and a second position in which the outwardly extending flow passage of the spool communicates with the port in the housing, and actuator means mounted in the spool and engageable with the check valve of the male coupling for opening the check valve, the improvement characterized by:

a pin movably mounted on the spool and engageable by the male coupling as the male coupling is inserted into the bore of the housing, the pin being movable between first and second positions by the male coupling, spring means for resiliently biasing the pin toward its first position, and locking means carried by the spool and cooperable with said pin for maintaining the spool in its first position, the locking means being movable between a locked position in which the spool is locked in its first position and an unlocked position in which the spool can move from its first position to its second position, the locking means being maintained in its locked position by the pin when the pin is in its first position whereby the spool will remain locked in its first position until the male coupling engages the pin and moves the pin from its first to its second position.

2. The coupling of claim 1 including seal means on the spool for sealingly engaging the male coupling, the seal means sealingly engaging the male coupling as the male coupling is inserted into said bore before the male coupling moves the pin out of its first position.

3. The coupling of claim 1 in which said locking means includes a radially movable detent engageable with the pin, the pin including a cam surface for moving the detent radially into and out of locking engagement with the housing.

4. The coupling of claim 1 in which said actuator means is movably mounted in the spool for movement between a first position and a second position, spring means engageable with the actuator means for resiliently biasing the actuator means to its first position, actuator-locking means in the spool movable between a locked position for locking the actuator means in its first position and an unlocked position, and cam means on the spool engageable with the male coupling and movably mounted between a first position for maintaining the actuator-locking means in its unlocked position and a second position for maintaining the actuator-locking means in its locked position, the actuator means being engageable with the check valve of the male coupling before the cam means is engageable with the male coupling and the cam means being movable from its first position to its second position when the actuator means is in its first position whereby the actuator means is locked in its first position when the check valve of the male coupling is not pressurized and the check valve is opened by engagement with the actuator means, the cam means being prevented from moving to its second position when the actuator means is out of its first position and being movable from its first position to its second position when the actuator means returns to its first position whereby the actuator means is movable to its second position when the check valve of the male coupling is pressurized and the actuator means returns to its first position and is locked in its first position when the check valve opens.

5. The coupling of claim 4 in which the cam means includes a sleeve movably mounted in the spool and having a cam surface engageable with the actuator-locking means, and a rod extending slidably and axially through the sleeve and being engageable with the male coupling, a first spring resiliently biasing the rod forwardly toward the open end of the bore of the housing, and a second spring engaging the sleeve and the rod for resiliently urging the sleeve to move rearwardly with the rod as the rod is moved rearwardly by the male coupling, rearward movement of the sleeve causing the actuator-locking means to move to its locked position.

6. The coupling of claim 5 in which the actuator-locking means comprises a ball movably mounted in the spool, the actuator means having a groove into which the ball is inserted when the actuator means is locked in its first position.

7. A quick disconnect female coupling for coaction with a check-valve equipped male coupling, the female coupling comprising: p1 a generally tubular housing having an axially extending bore open at one end for receipt of said male coupling and a port through the housing communicating with said bore, a spool slidably mounted in said bore and having a central flow passage and an outwardly extending flow passage extending therethrough communicating with the central flow passage, the spool being movable between a first position in which the outwardly extending flow passage of the spool is sealed from said port in the housing and a second position in which the outwardly extending flow passage of the spool communicates with the port in the housing, and an actuator mounted in the spool and engageable with the check valve of the male coupling for opening the check valve, the actuator being movably mounted in the spool for movement between a first position and a second position, the improvement characterized by:

spring means engageable with the actuator for resiliently biasing the actuator to its first position, locking means on the spool movable between a locked position for locking the actuator in its first position and an unlocked position, cam means on the spool engageable with the male coupling and movably mounted between a first position for maintaining the locking means in its unlocked position and a second position for maintaining the locking means in its locked position, the actuator being engageable with the check valve of the male coupling before the cam means is engageable with the male coupling and the cam means being movable from its first position to its second position when the actuator is in its first position whereby the actuator is locked in its first position when the check valve of the male coupling is not pressurized and the check valve is opened by engagement with the actuator, the cam means being prevented from moving to its second position when the actuator is out of its first position and being movable from its first position to its second position when the actuator returns to its first position whereby the actuator means is movable to its second position when the check valve of the male coupling is pressurized and the actuator means returns to its first position and is locked in its first position when the check valve opens.

8. The coupling of claim 7 in which the cam means includes a sleeve movably mounted in the spool and having a cam surface engageable with the locking means, and a rod extending slidably and axially through the sleeve and being engageable with the male coupling, a first spring resiliently biasing the rod forwardly toward the open end of the bore of the housing, and a second spring engaging the sleeve and the rod for resiliently urging the sleeve to move rearwardly with the rod as the rod is moved rearwardly by the male coupling, rearward movement of the sleeve causing the locking means to move to its locked position.

9. The coupling of claim 7 in which the locking means comprises a ball movably mounted in the spool, the actuator having a groove into which the ball is inserted when the actuator is locked in its first position.

* * * * *